(12) United States Patent
Kim et al.

(10) Patent No.: US 11,434,336 B2
(45) Date of Patent: Sep. 6, 2022

(54) COMPOSITION AND METHOD FOR MANUFACTURING A FILM COMPRISING THIOURETHANE LAYER

(71) Applicant: SKC Co., Ltd., Suwon-si (KR)

(72) Inventors: Sang Mook Kim, Suwon-si (KR); Sungjin Chung, Suwon-si (KR); Haksoo Lee, Suwon-si (KR)

(73) Assignee: SKC Co., Ltd., Suwon-si (KR)

( * ) Notice: Subject to any disclaimer, the term of this patent is extended or adjusted under 35 U.S.C. 154(b) by 0 days.

(21) Appl. No.: 17/491,783

(22) Filed: Oct. 1, 2021

(65) Prior Publication Data

US 2022/0106450 A1 Apr. 7, 2022

(30) Foreign Application Priority Data

Oct. 5, 2020 (KR) .................. 10-2020-0128083
Oct. 5, 2020 (KR) .................. 10-2020-0128085

(51) Int. Cl.
*C08J 5/18* (2006.01)
*C08G 18/24* (2006.01)
(Continued)

(52) U.S. Cl.
CPC ............ *C08J 5/18* (2013.01); *B32B 3/263* (2013.01); *B32B 17/10005* (2021.01);
(Continued)

(58) Field of Classification Search
None
See application file for complete search history.

(56) References Cited

U.S. PATENT DOCUMENTS

2004/0217495 A1* 11/2004 Takeda ............ B29D 11/00432
425/808
2015/0276986 A1* 10/2015 Ryu ............... B29D 11/00644
359/488.01
2017/0361575 A1* 12/2017 Kusu ...................... B60J 1/001

FOREIGN PATENT DOCUMENTS

JP 2000-28801 A 1/2000
JP 2003-26674 A 1/2003
(Continued)

OTHER PUBLICATIONS

Okubo, Tsuyoshi, et al., "Synthesis, characterization, and optical properties of polymers comprising 1,4-dithiane-2, 5-bis (thiomethyl) group," *Journal of applied polymer science*, 68, 11, 1998 (pp. 1791-1799).

*Primary Examiner* — Tae H Yoon
(74) *Attorney, Agent, or Firm* — NSIP Law

(57) ABSTRACT

A film for glass bonding includes a thiourethane layer comprising a heterocyclo-alkanediyl-based repeat unit indicated by Formula 1,

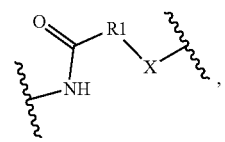

and a linear alkanediyl-based repeat unit indicated by Formula 2, (Continued)

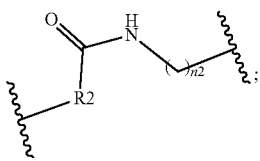

and a base layer, disposed on a surface of the thiourethane layer, comprising a polyvinyl acetal resin and a plasticizer. In the Formula 1, R1 is —O— or —S—, and X is a heterocyclo-alkanediyl group having carbon atoms of 3 to 10 and sulfur atoms of 1 to 5, and in the Formula 2, R2 is —O— or —S—, and n2 is an integer of 4 to 10.

5 Claims, 6 Drawing Sheets

(51) Int. Cl.
| | |
|---|---|
| *C08G 18/75* | (2006.01) |
| *C08G 18/73* | (2006.01) |
| *C08G 18/38* | (2006.01) |
| *C08G 18/48* | (2006.01) |
| *C08K 5/134* | (2006.01) |
| *B32B 27/40* | (2006.01) |
| *B32B 27/30* | (2006.01) |
| *B32B 27/08* | (2006.01) |
| *B32B 27/22* | (2006.01) |
| *B32B 37/18* | (2006.01) |
| *B32B 3/26* | (2006.01) |
| *B32B 17/10* | (2006.01) |

(52) U.S. Cl.
CPC .... *B32B 17/10036* (2013.01); *B32B 17/1077* (2013.01); *B32B 17/10761* (2013.01); *B32B 27/08* (2013.01); *B32B 27/22* (2013.01); *B32B 27/30* (2013.01); *B32B 27/40* (2013.01); *B32B 37/185* (2013.01); *C08G 18/246* (2013.01); *C08G 18/3876* (2013.01); *C08G 18/4833* (2013.01); *C08G 18/73* (2013.01); *C08G 18/758* (2013.01); *C08K 5/134* (2013.01); *B32B 2307/418* (2013.01); *B32B 2307/54* (2013.01); *B32B 2329/06* (2013.01); *B32B 2375/00* (2013.01); *B32B 2605/006* (2013.01); *B32B 2605/08* (2013.01); *C08J 2331/02* (2013.01); *C08J 2375/04* (2013.01)

(56) References Cited

FOREIGN PATENT DOCUMENTS

| | | |
|---|---|---|
| JP | 2004-231538 A | 8/2004 |
| JP | 2018-58448 A | 4/2018 |
| KR | 10-0222194 B1 | 7/1997 |
| KR | 10-2009-0038483 A | 4/2009 |
| KR | 10-2009-0045368 A | 5/2009 |
| KR | 10-2010-0093092 A | 8/2010 |
| KR | 10-2012-0008779 A | 2/2012 |
| KR | 10-1310022 B1 | 9/2013 |
| KR | 10-1331284 B1 | 11/2013 |
| KR | 10-2014-0029298 A | 3/2014 |
| KR | 10-1401784 B1 | 5/2014 |
| KR | 10-2018-0015746 A | 2/2018 |
| KR | 10-2019-0036837 A | 4/2019 |
| KR | 10-2005189 B1 | 7/2019 |

\* cited by examiner

COMPOSITION AND METHOD FOR MANUFACTURING A FILM COMPRISING THIOURETHANE LAYER

CROSS-REFERENCE TO RELATED APPLICATIONS

This application claims the benefit under 35 U.S.C. 119(a) of Korean Patent Application No. 10-2020-0128085 filed on Oct. 5, 2020, and No. 10-2020-0128083 filed on Oct. 5, 2020, in the Korean Intellectual Property Office, the entire disclosures of which are incorporated herein by reference for all purposes.

BACKGROUND

1. Field

The following description relates to a composition and method for manufacturing a film comprising thiourethane layer.

2. Description of Related Art

A film for bonding is used in laminated glass (safety glass) or an interlayer of a light-transmitting laminate. Laminated glass is mainly used in windows of architecture, cladding, and window glass of automobiles. Due to characteristics, such as anti-scattering of glass fragments when broken and penetration resistance against impact of a certain strength, laminated glass can secure stability to minimize damage or injury given to objects or people placed in the vicinity of the laminate glass.

In an example of applying head-up display, when an image is reflected projected on a windshield of an automobile by a projector disposed at a dashboard area or a roof area of an automobile, this reflected image is perceived by a driver. Such a head-up display can allow a driver to simultaneously obtain important data such as current driving information, navigation information, and warning messages, even when a driver watches a road ahead. This capability may improve the convenience of driving and traffic safety.

Since a head-up display reflects a projector image to a windshield of an automobile, the image is reflected in both surfaces (an inside surface and an outside surface) of the windshield. So that the head-up display has a basic problem: a desired primary image and a secondary image (ghost image) appear together in a weaker intensity may be perceived to a driver. A method applied to solve this problem is by applying a wedge-shaped vertical cross-section as an interlayer between a pair of glasses.

A film for bonding may have different properties depending on the structure, amount, and polymerizing method of a monomer included in a resin composition applied to manufacture. Specifically, adjusting the composition and polymerizing method of a resin composition can help to improve the visibility of a HUD image and increase the workability of a film for bonding.

The above-described background technology is technical information acquired by the inventor for derivation of an embodiment or acquired during the derivation process and is not necessarily a prior art disclosed to the general public before filing the present disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a film for glass bonding includes a thiourethane layer comprising a heterocyclo-alkanediyl-based repeat unit indicated by Formula 1,

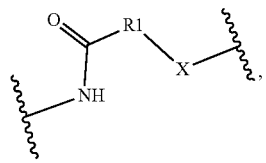

and a linear alkanediyl-based repeat unit indicated by Formula 2,

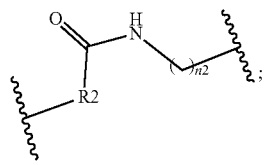

and a base layer, disposed on a surface of the thiourethane layer, comprising a polyvinyl acetal resin and a plasticizer. In the Formula 1, R1 is —O— or —S—, and X is a heterocyclo-alkanediyl group having carbon atoms of 3 to 10 and sulfur atoms of 1 to 5, and in the Formula 2, R2 is —O— or —S—, and n2 is an integer of 4 to 10.

The heterocyclo-alkanediyl-based repeat unit may include a repeat unit indicated by Formula 3

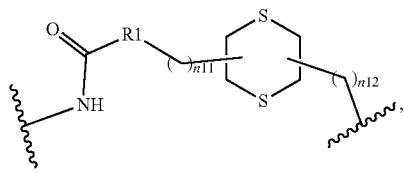

wherein R1 is —O— or —S—, and n11 and n12 are respectively independent integers of 0 to 3.

The thiourethane layer may have a refractive index of 1.5 or more, and a modulus of 300 kgf/mm² or less.

A light transmitting laminate may include a first light transmitting layer, wherein the film above is disposed on a surface of the first light transmitting layer; and a second light transmitting layer disposed on the film.

In another general aspect, a manufacturing method for a film includes putting a thiourethane resin comprising a heterocyclo-alkanediyl-based repeat unit indicated by Formula 1,

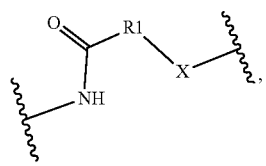

and a linear alkanediyl-based repeat unit indicated by Formula 2,

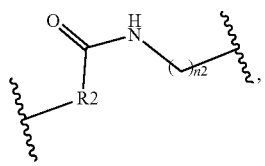

into an extruder; extruding the thiourethane resin at a temperature of 120 to 200° C. to manufacture a thiourethane layer; putting a resin composition comprising a polyvinyl acetal resin and a plasticizer into an extruder and extruding the resin composition to manufacture a base layer; and hot pressing the base layer disposed on a surface of on the thiourethane layer to form the film. In the Formula 1, R1 is —O— or —S—, and X is a heterocyclic-alkanediyl group having carbon atoms of 4 to 10 and sulfur atoms of 1 to 5, and in the Formula 2, R2 is —O— or —S—, and n2 is an integer of 4 to 10.

A glass bonding film may include the film above.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
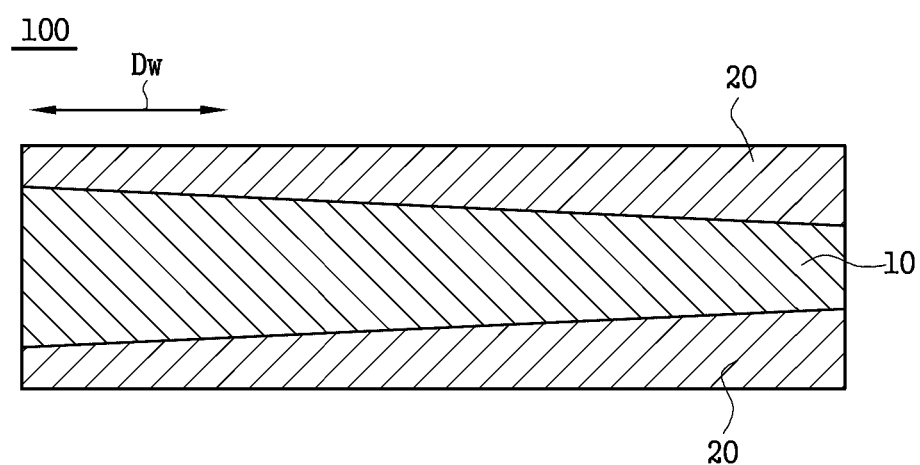
FIG. 1 is a conceptual view illustrating a film in accordance with one embodiment of the present application.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In this application, terms for degree like "about", "substantially" and so on are used for meaning values approximative from/to the value when a tolerance to be proper to referred meaning for manufacture and substance is presented. Additionally, these terms for degree are used to help understand example embodiments and to prevent the presented content in which exact or absolute number is referred from being unjustly used by unconscionable trespassers.

Throughout this application, the phrase "combination(s) thereof" included in a Markush-type expression denotes one or more mixtures or combinations selected from the group consisting of components stated in the Markush-type expression, that is, denotes that one or more components selected from the group consisting of the components are included.

In this application, "B being placed on A" means that B is placed in direct contact with A or placed over A with another layer or structure interposed therebetween and thus should not be interpreted as being limited to B being placed in direct contact with A.

In this application, a singular form is contextually interpreted as including a plural form as well as a singular form unless specially stated otherwise.

In this application, a polygon refers to a two-dimensional figure having three or more sides, includes a triangle, a quadrangle, a pentagon, a hexagon, and the like, and includes also figures including a curved shape having infinite sides such as a circle, an oval, and the like in the whole or part of the polygon.

In this application, an amount of hydroxyl group was evaluated by measuring an amount of ethylene group combined with hydroxyl group of the polyvinyl acetal resin in accordance with a method based upon JIS K6728.

Unless specially stated in this application, alkanediyl is a divalent atom group made by subtracting two hydrogen atoms from alkane, and may be represented as a general expression —$C_nH_{2n}$—.

Unless specially stated in this application, alkenediyl is a divalent atom group made by subtracting two hydrogen atoms from alkene, and may be represented as a general expression —$C_nH_{2n-2}$— or the like.

Unless specially stated in this application, alkynediyl is a divalent atom group made by subtracting two hydrogen atoms from alkyne, and may be represented as a general expression —$C_nH_{2n-4}$— or the like.

In the present application, room temperature refers to 20 to 25° C.

In the present application, refractive index refers to a value measured at a measuring wave to be D line (589.29 nm) and temperature to be 20° C.

A film for bonding may be applied to a HUD (Head-Up Display) system, and the film for bonding may have a wedge-shaped section overall by having a thickness deviation in a width direction of the film for preventing double image formation when an image is reflected on a surface of a laminate comprising the film. In this case, inconvenience may be caused by a winding process and subsequent processes depending on a thickness deviation of the film in a width direction of the film.

The inventors of example embodiments have verified that when two or more layers different in the refractive index are laminated, the laminated film can have a function of preventing double image formation even though the film has a reduced thickness deviation in a width direction of the film or substantially does not have a thickness deviation in a width direction of the film.

In addition, the inventors of example embodiments confirmed a problem of generating unevenness in a winded roll during a winding process if a flexibility difference between laminated layers is not regulated. Also, delamination between layers may occur because an interface bonding strength between two layers laminated to be adjacent is deficient, and this has been confirmed as a problem that can lead to optical defects of a light-transmitting laminate.

Accordingly, the inventors of example embodiments have verified that by applying a certain thiourethane layer to a high refractive layer, and adjusting a refractive index of the thiourethane layer, double image formation can be prevented when a HUD system is applied and a thickness deviation in a width direction of a film can be reduced. Also, the inventors of example embodiments have verified that when a modulus of a thiourethane layer is adjusted, unevenness on the surface of a film can be prevented, delamination between layers can be substantially inhibited, and the winding process of the film can be easily worked, thereby completing example embodiments of a film comprising a thiourethane layer and the like.

Hereinafter, the present embodiments will be described in further detail.

Figure 2:
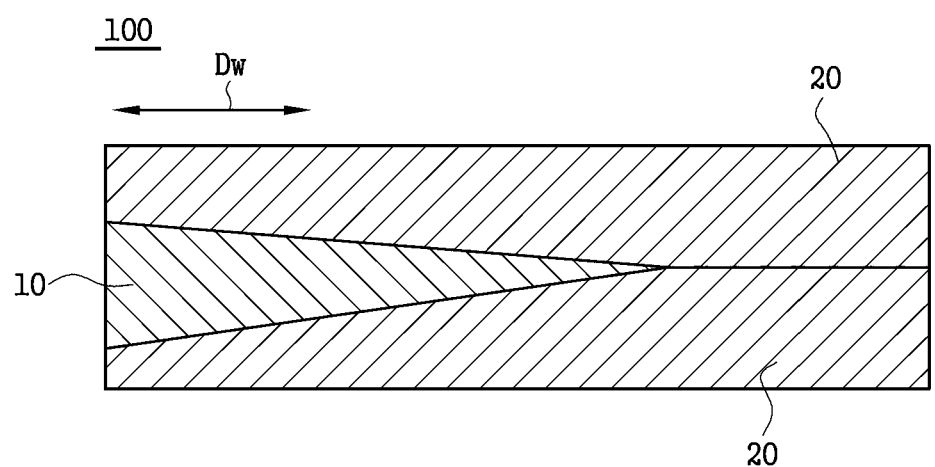
FIG. 2 is a conceptual view illustrating a film in accordance with another embodiment of the present application.

FIG. 1 is a conceptual view of a film in accordance with one embodiment of the present application. FIG. 2 is a conceptual view of a film in accordance with another embodiment of the present application. Referring to FIG. 1 and FIG. 2, below example embodiments are described in detail. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Film and Film for Bonding

In one general aspect, a film 100 in accordance with one embodiment disclosed in the present application comprises a thiourethane layer 10 comprising a thiourethane-based repeat unit described in the below.

A film 100 may further comprise a base layer 20 on a surface of the thiourethane layer 10.

A film 100 may further comprise base layers 20 on a first surface and a second surface of the thiourethane layer 10.

A film 100 may have a wedge-shaped section whose thickness varies in a width direction Dw of the film in part or the whole of the film 100.

A thiourethane layer 10 may have a wedge-shaped section whose thickness varies in a width direction Dw of the film in part or the whole of the thiourethane layer 10.

A film may have a thickness that is substantially even in a width direction Dw of the film.

In one general aspect, a film 100 in accordance with one embodiment disclosed in the present application comprises a thiourethane layer 10 comprising a thiourethane-based repeat unit described below as a high refractive layer.

A film 100 may further comprise a base layer 20 on a surface of a thiourethane layer 10.

A film 100 may further comprise base layers 20 on a first surface and a second surface of the thiourethane layer 10.

A film 100 may be a film for glass bonding having the function of preventing double image formation.

A film 100 may have a wedge-shaped section whose thickness varies in a width direction Dw of the film in part or the whole of the film 100.

A thiourethane layer 10 as a high refractive layer may have a wedge-shaped section whose thickness varies in a width direction Dw of the film in part or the whole of the thiourethane layer 10.

A film may have a thickness that is substantially even in a width direction Dw of the film.

A film for bonding may comprise a high refractive layer.

A film for bonding may further comprise a high refractive layer and a base layer disposed on a surface of the high refractive layer.

A film 100 may be applied as a film for bonding.

A thiourethane layer 10 may be applied as a high refractive layer in a film for bonding.

Thiourethane Layer and High Refractive Layer

A thiourethane layer 10 comprises a thiourethane-based repeat unit.

A high refractive layer is a thiourethane layer 10, and comprises a thiourethane-based repeat unit.

A thiourethane-based repeat unit is a repeat unit included in a polythiourethane.

A thiourethane layer 10 may have a refractive index of 1.5 or more.

A thiourethane layer 10 may have a modulus of 300 kgf/mm$^2$ or less.

A high refractive layer may have a refractive index of 1.5 or more.

A high refractive layer may have a modulus of 300 kgf/mm$^2$ or less.

In embodiments, polythiourethane refers to i) a compound generated from the reaction of a thiol-based compound and a diisocyanate compound, or ii) a compound generated from the reaction of a mixture of a thiol-based compound and a polyol-based compound and a diisocyanate compound.

A thiourethane-based repeat unit may comprise a cyclo-alkanediyl-based repeat unit.

A thiourethane-based repeat unit may comprise a cyclo-alkenediyl-based repeat unit.

A thiourethane-based repeat unit may comprise a heterocyclo-alkanediyl-based repeat unit having carbon atoms of 3 to 10. A thiourethane-based repeat unit may comprise a heterocyclo-alkenediyl-based repeat unit having carbon atoms of 3 to 10.

A thiourethane-based repeat unit may comprise a linear alkanediyl-based repeat unit having carbon atoms of 4 to 10. A thiourethane-based repeat unit may comprise a linear alkenediyl-based repeat unit having carbon atoms of 4 to 10. A thiourethane-based repeat unit may comprise a linear alkynediyl-based repeat unit having carbon atoms of 4 to 10.

A heterocyclo-alkanediyl-based repeat unit and a heterocyclo-alkenediyl-based repeat unit may respectively comprise a sulfur atom in the repeat unit.

A heterocyclo-alkanediyl-based repeat unit may be a heterocyclo-alkanediyl having carbon atoms of 4 to 10 and sulfur atoms of 1 to 5. A heterocyclo-alkanediyl-based repeat unit may be a heterocyclo-alkanediyl having carbon atoms of 4 to 9 and sulfur atoms of 2 to 5.

A heterocyclo-alkanediyl-based repeat unit may comprise a dithiane functional group. A heterocyclo-alkanediyl-based repeat unit may comprise 1,2-dithiane functional group. A heterocyclo-alkanediyl-based repeat unit may comprise 1,3-dithiane functional group. A heterocyclo-alkanediyl-based repeat unit may comprise 1,4-dithiane functional group. For example, the heterocyclo-alkanediyl-based repeat unit may be methyldithiane functional group, dimethyldithiane functional group, ethylmethyldithiane functional group, or diethyldithian functional group.

Specifically, a thiourethane layer 10 may comprise a heterocyclo-alkanediyl-based repeat unit indicated by below Formula 1.

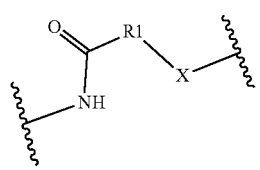

[Formula 1]

In Formula 1, R1 is —O— or —S—, and X is a heterocyclo-alkanediyl group having carbon atoms of 3 to 10 and sulfur atoms of 1 to 5.

In Formula 1, R1 may be —O— or —S—, and X may be a heterocyclo-alkanediyl group having carbon atoms of 3 to 8 and sulfur atoms of 1 to 5.

In Formula 1, R1 may be —S—, and X may be a heterocyclo-alkanediyl group having carbon atoms of 3 to 8 and sulfur atoms of 2 to 3.

A heterocyclo-alkenediyl-based repeat unit is a repeat unit made from a heterocyclo-alkanediyl-based repeat unit indicated by Formula 1 through substitution from one to three single bonds between carbon and carbon to double bonds between carbon and carbon. A heterocyclo-alkenediyl-based repeat unit may be a heterocyclo-alkenediyl having carbon atoms of 3 to 10 and sulfur atoms of 1 to 5. A heterocyclo-alkenediyl-based repeat unit may be a heterocyclo-alkenediyl having carbon atoms of 3 to 8 and sulfur atoms of 2 to 5.

A heterocyclo-alkanediyl-based repeat unit may be a repeat unit indicated by below Formula 3.

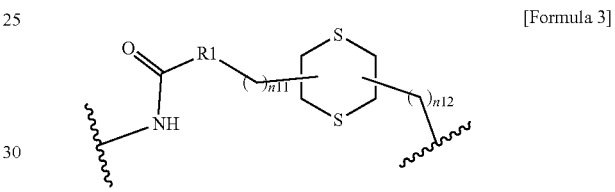

[Formula 3]

In Formula 3, R1 is —O— or —S—, and n11 and n12 are respectively independent integers of 0 to 3.

In Formula 3, R1 is —S—, and n11 and n12 are respectively independent integers of 1 or 2.

A heterocyclo-alkenediyl-based repeat unit is a repeat unit made from a heterocyclo-alkanediyl-based repeat unit indicated by Formula 3 through substitution from one to three single bonds between carbon and carbon to double bonds between carbon and carbon.

A heterocyclo-alkenediyl-based repeat unit may be a repeat unit comprising one or two oxygen atoms, two or three sulfur atoms, and 1,4-dithiane group.

A heterocyclo-alkenediyl-based repeat unit may be a repeat unit comprising one oxygen atom, three sulfur atoms, and 1,4-dithiane group.

For example, a heterocyclo-alkenediyl-based repeat unit may comprise 1,4-dithiacyclohex-2-ene or 1,4-dithiacyclohex-4-ene group.

A thiourethane-based repeat unit may comprise a linear alkanediyl-based repeat unit. A thiourethane-based repeat unit may comprise a linear alkenediyl-based repeat unit. A thiourethane-based repeat unit may comprise a linear alkynediyl-based repeat unit.

A thiourethane-based repeat unit may comprise a linear alkanediyl-based repeat unit having carbon atoms of 4 to 10. A thiourethane-based repeat unit may comprise a linear alkenediyl-based repeat unit having carbon atoms of 4 to 10. A thiourethane-based repeat unit may comprise a linear alkynediyl-based repeat unit having carbon atoms of 4 to 10.

A linear alkenediyl-based repeat unit having carbon atoms of 4 to 10 is a repeat unit made from a linear alkanediyl-based repeat unit having carbon atoms of 4 to 10 through substitution from one to three single bonds between carbon and carbon to double bonds between carbon and carbon. For example, an alkenediyl-based repeat unit may be 2-hexenediyl-based repeat unit or 3-hexenediyl-based repeat unit.

A linear alkynediyl-based repeat unit having carbon atoms of 4 to 10 is a repeat unit made from a linear alkanediyl-based repeat unit having carbon atoms of 4 to 10 through substitution from one to three single bonds between carbon and carbon to triple bonds between carbon and carbon. For example, an alkynediyl-based repeat unit may be 2-hexynediyl-based repeat unit or 3-hexynediyl-based repeat unit.

Specifically, a thiourethane layer 10 may comprise a linear alkanediyl-based repeat unit indicated by below Formula 2.

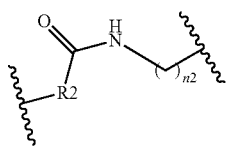

[Formula 2]

In Formula 2, R2 is —O— or —S—, and n2 is an integer of 4 to 10.

In Formula 2, R2 may be —O— or —S—, and n2 may be an integer of 5 to 8.

In Formula 2, R2 may be —O— or —S—, and n2 may be an integer of 5 to 7.

A thiourethane layer 10 may comprise a linear alkenediyl-based repeat unit made from a linear alkanediyl-based repeat unit indicated by Formula 2 through substitution from one to three single bonds between carbon and carbon to double bonds between carbon and carbon.

A thiourethane layer 10 may comprise a linear alkynediyl-based repeat unit made from a linear alkanediyl-based repeat unit indicated by Formula 2 through substitution from one to three single bonds between carbon and carbon to triple bonds between carbon and carbon.

A thiourethane layer 10 may comprise a heterocycloalkanediyl-based repeat unit and a linear alkanediyl-based repeat unit together and thereby adjust a refractive index and a modulus of a thiourethane layer 10 simultaneously.

A thiourethane layer 10 may comprise a repeat unit of Formula 1 in an amount of 20 to 50 mol % based on the entire thiourethane layer 10. A thiourethane layer 10 may comprise a repeat unit of Formula 1 in an amount of 22 to 48 mol % based on an entire thiourethane layer 10. In such a case, a thiourethane layer 10 having a higher refractive index can be obtained. When such a thiourethane layer 10 is applied to a film 100 as a high refractive layer, the film 100 can have a substantially even thickness in a width direction Dw of the film and also have a function of preventing double image formation.

A thiourethane layer 10 may comprise a repeat unit of Formula 3 in an amount of 20 to 50 mol % based on the entire thiourethane layer 10. A thiourethane layer 10 may comprise a repeat unit of Formula 3 in an amount of 22 to 48 mol % based on an entire thiourethane layer 10. When such a thiourethane layer 10 is applied to a film 100 as a high refractive layer, the film 100 can have a substantially even thickness in a width direction Dw of the film and also have a function of preventing double image formation.

A thiourethane layer 10 may comprise a repeat unit of Formula 2 in an amount of 20 to 50 mol % based on an entire thiourethane layer 10. A thiourethane layer 10 may comprise a repeat unit of Formula 2 in an amount of 30 to 50 mol % based on an entire thiourethane layer 10. In such a case, a modulus of a film 100 comprising a thiourethane layer 10 can be lowered more. Such a characteristic can help a film 100 to be easily winded in a roll shape.

A thiourethane layer 10 may comprise sulfur atoms in an amount of 15 to 35 wt %. A thiourethane layer 10 may comprise sulfur atoms in an amount of 17 to 30 wt %. A thiourethane layer 10 may comprise sulfur atoms in an amount of 20 to 25 wt %. In such a case, a refractive index of a thiourethane layer 10 can be higher.

A thiourethane layer 10 may have a number-average molecular weight of 5,000 to 500,000. The number-average molecular weight may be 6,000 to 450,000. The number-average molecular weight may be 7,000 to 400,000. In such a case, the degree of polymerization of a polyfunctional compound and a diisocyanate-based compound can be regulated. A modulus of a thiourethane layer 10 can show a value within the desired range.

A thiourethane layer 10 may have a refractive index of 1.5 or more. When a thiourethane layer 10 having a high refractive characteristic is included inside a film 100, an incident light toward a surface of a thiourethane layer 10 or an interface between a thiourethane layer 10 and an adjacent layer of the thiourethane layer from a HUD projector can be refracted or reflected in a predetermined angle. Thus, when a projector image is reflected on a light-transmitting laminate comprising the film 100, the formation of a double image can be inhibited or alleviated.

A thiourethane layer 10 may have a refractive index of 1.5 or more. A thiourethane layer 10 may have a refractive index of 1.55 or more. A thiourethane layer 10 may have a refractive index of 1.60 or more. A thiourethane layer 10 may have a refractive index of 2.5 or less. A thiourethane layer 10 may have a refractive index of 2.3 or less. A thiourethane layer 10 may have a refractive index of 2.0 or less. When such a thiourethane layer 10 is applied as a high refractive layer of a film for bonding, the formation of a double image on a light-transmitting laminate can be substantially inhibited, and thickness variation in a width direction Dw of the film 100 can be decreased.

For example, the refractive index can be measured using the DR-M4 model, an Abbe refractometer available from ATAGO.

A thiourethane layer 10 may have a modulus of 300 kgf/mm$^2$ or less. A film comprising a thiourethane layer 10 may be winded in a roll shape for easy storage and delivery after the manufacture. When a thiourethane layer 10 has a proper flexibility, the film 100 can be winded without adding an excessive strength. Thus, damage can be prevented in a film 100, and subsequent processes such as unwinding the film 100 and laminating the film with a light transmitting layer can be facilitated. Additionally, when a film comprises a thiourethane layer 10 and a base layer 20, a high refractive layer is applied to the thiourethane layer 10, and a resin different from resin applied to the thiourethane layer 10 is applied to the base layer 20, a bonding strength between a high refractive layer 10 and a base layer 20 can be enhanced. Thus, the optical properties of a film 100 can be more improved.

A thiourethane layer 10 may have a modulus of 300 kgf/mm$^2$ or less. A thiourethane layer 10 may have a modulus of 200 kgf/mm$^2$ or less. A thiourethane layer 10 may have a modulus of 100 kgf/mm$^2$ or less. A thiourethane layer 10 may have a modulus of 25 kgf/mm$^2$ or more. A thiourethane layer 10 may have a modulus of 30 kgf/mm$^2$ or more. A thiourethane layer 10 may have a modulus of 50 kgf/mm$^2$ or more. In such a case, defect occurrence can be inhibited when a film 100 is winded.

For example, the modulus can be measured through UTM 5566A model available from INSTRON.

Base Layer

A film of example embodiments may further comprise a base layer 20 disposed on a surface, or a first surface and a second surface of a thiourethane layer 10. A film 100 of example embodiments is a film for bonding, and may further comprise a base layer 20 disposed on a surface or both surfaces of a high refractive layer.

A base layer 20 may comprise a polyvinyl acetal repeat unit. A base layer 20 may comprise a polyurethane repeat unit. A base layer 20 may comprise an ethylene vinyl acetate repeat unit.

A base layer 20 may comprise a polyvinyl acetal resin or a polyvinyl acetal resin and a plasticizer.

Specifically, a base layer 20 may comprise a polyvinyl acetal resin in an amount of 60 to 76 wt %, 70 to 76 wt %, or 71 to 74 wt %. When a base layer 20 comprises the polyvinyl acetal resin in such a range, relatively higher tensile strength and modulus can be achieved in a film 100.

The polyvinyl acetal resin may have an acetyl group in an amount of less than 2 wt %, and specifically, in an amount of 0.001 or more and less than 1.5 wt %. The polyvinyl acetal resin may have a hydroxyl group in an amount of 15 wt % or more, 16 wt % or more, or 19 wt % or more. Also, the polyvinyl acetal resin may have a hydroxyl group in an amount of 30 wt % or less.

When a polyvinyl acetal resin with such a characteristic is applied to a base layer 20, a film 100 can have mechanical properties such as proper penetration resistance while excellently bonded with a material such as glass.

The polyvinyl acetal resin may be a polyvinyl acetal resin obtained by acetalization of a polyvinyl alcohol having a polymerization degree of 1,600 to 3,000 with aldehyde, or may be a polyvinyl acetal resin obtained by acetalization of a polyvinyl alcohol having a polymerization degree of 1,700 to 2,500 with aldehyde. When such a polyvinyl acetal resin is applied to a base layer 20, mechanical properties like penetration resistance of a film 100 can be sufficiently improved.

The polyvinyl acetal resin may be one synthesized from polyvinyl alcohol and aldehyde, and the aldehyde is not limited to the type. Specifically, the aldehyde may be any one selected from the group consisting of n-butyl aldehyde, isobutyl aldehyde, n-valer aldehyde, 2-ethyl butyl aldehyde, n-hexyl aldehyde, and blend resins thereof. When n-butyl aldehyde is applied as the aldehyde, produced polyvinyl acetal resin may have a characteristic in refractive index the difference of which with a refractive index of glass is small, and a characteristic in excellent adhesion with glass and the like.

A base layer 20 may comprise a plasticizer in an amount of 24 to 40 wt %, 24 to 30 wt %, or 26 to 29 wt % based on an entire base layer 20. When a film 100 is applied as a film for bonding in such a case, it is good in that the film 100 can achieve a proper bonding strength and impact resistance.

Specifically, the plasticizer may be any one selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and combinations thereof. Specifically, any one selected from the group consisting of triethylene glycol di-2-ethyl butyrate, triethylene glycol di-2-ethylhexanoate, triethylene glycol di-n-heptanoate, and compositions thereof may be comprised as the plasticizer, and further specifically, triethylene glycol bis 2-ethylhexanoate (3G8) may be applied.

A base layer 20 may further comprise an additive as needed. For example, the additive may be any one selected from the group consisting of an antioxidant, a heat stabilizer, a UV absorber, a UV stabilizer, an IR absorber, a glass adhesion regulator, and combinations thereof.

As the antioxidant, a hindered amine-based antioxidant or a hindered phenol-based antioxidant may be used. Specifically, on the process of manufacturing polyvinyl butyral (PVB) which needs a processing temperature of 150° C. or higher, a hindered phenol-based antioxidant may be desired. The hindered phenol-based antioxidant may be for example, IRGANOX 1976, 1010 or so on available from BASF SE.

As the heat stabilizer, a phosphite-based heat stabilizer may be used considering suitability with an antioxidant. For example, IRGAFOS 168 available from BASF SE may be used.

As the UV absorber, Chemisorb 12, Chemisorb 79, Chemisorb 74, or Chemisorb 102 available from CHEMIPRO KASEI KAISHA, Ltd or Tinuvin 328, Tinuvin 329, or Tinuvin 326 available from BASF SE may be used. As the UV stabilizer, Tinuvin available from BASF SE may be used. As the IR absorber, ITO, ATO, and AZO may be used. As the glass adhesion regulator, a salt of a metal such as magnesium (Mg), potassium (K), sodium (Na), epoxy-based modified silicon (Si) oil, or mixtures thereof may be used, but the present application is not limited thereto.

A base layer 20 may comprise a polyurethane resin. The polyurethane resin may be a thermoplastic polyurethane. A polyurethane resin may be manufactured through polycondensation of polyisocyanate and polyestherdiol. A polyurethane resin may be a polyurethan resin having an average molecular weight of 5,000 to 40,000 g/mol.

A base layer 20 may comprise an ethylene vinyl acetate resin. A base layer 20 may comprise an ethylene vinyl acetate resin, a cross-linking agent, and a silane coupling agent. An ethylene vinyl acetate resin may comprise a vinyl acetate-based repeat unit in an amount of 5 wt % to 80 wt %.

A base layer 20 may comprise an area varying in thickness in a width direction Dw of a film 100. In a section within a base layer 20 corresponding to a thiourethane layer, a thickness of a base layer 20 in a width direction Dw of a film 100 may be changed to be opposite to the thiourethane layer 10 (or a high refractive layer) described in the above. Specifically, when a film 100 is observed in the cross-section in a width direction Dw, a thickness of a base layer 20 may be decreased in a section having a thickness of a thiourethane layer 10, which increases in a width direction Dw. When a film is observed in the cross-section in a width direction Dw of a film 100, a thickness of a base layer 20 may be increased in a section having a thickness of a thiourethane layer 10, which decreases in a width direction Dw of a film 100. Thus, variation in the thickness in a width direction Dw of a film 100 can be decreased. That is, a base layer 20 may be comprised with a thiourethane layer 10 in a film 100 together, a thickness deviation in a width direction Dw of a film 100 may be regulated, and thereby convenience in works such as a winding process and subsequent processes of a film for bonding 100 can be enhanced.

A film 100 may comprise a base layer 20 disposed to be in direct contact with a surface of a thiourethane layer 10.

A film 100 may additively comprise other layers between a base layer 20 and a thiourethane layer 10.

The other layer may be, for example, a shade band layer or a sound-insulating layer, but is not limited thereto.

A base layer 20 may function as a bonding layer that can bond a light-transmitting layer and a film 100 without applying an additive bonding layer when a film 100 is bonded with a light-transmitting layer like glass.

Referring to FIG. 2, a base layer 20 and a thiourethane layer 10 may differ in the thickness in a width direction Dw of a film 100. A length of a base layer 20 in a width direction Dw of a film 100 may be longer than a length of a thiourethane layer 10 in a width direction Dw of a film 100.

A refractive index of a base layer 20 may be a smaller value by 0.08 or more compared to a refractive index of a thiourethane layer 10. A refractive index of a base layer 20 may be a smaller value by 0.10 or more compared to a refractive index of a thiourethane layer 10. A refractive index of a base layer 20 may be a smaller value by 0.3 or more compared to a refractive index of a thiourethane layer 10. A refractive index of a base layer 20 may be a smaller value by 0.2 or more compared to a refractive index of a thiourethane layer 10.

The value of subtracting a refractive index of a base layer 20 from a refractive index of a thiourethane layer 10 may be 0.02 or more. The value of subtracting a refractive index of a base layer 20 from a refractive index of a thiourethane layer 10 may be 0.05 or more. The value of subtracting a refractive index of a base layer 20 from a refractive index of a thiourethane layer 10 may be 0.3 or less. The value of subtracting a refractive index of a base layer 20 from a refractive index of a thiourethane layer 10 may be 0.2 or less.

In such a case, a light passing a base layer 20 may be reflected in an angle of a predetermined range and refracted at the same time due to a difference of refractive indexes of a base layer 20 and a thiourethane layer 10, in an interface of a thiourethane layer 10 and an adjacent layer, and thereby can inhibit the formation of a double image on a light-transmitting laminate.

A value of subtracting a modulus of a base layer 20 from a modulus of a thiourethane layer 10 may be 0.1 to 299 kgf/mm$^2$.

A film 100 may become a roll shape by winding the film in which a base layer 20 and a thiourethane layer 10 are laminated. When a difference value between a modulus of a thiourethane layer 10 and a modulus of a base layer 20 is regulated, the protruding occurrence of a roll and a wrinkle generation within a film 100 caused by a stress difference between a base layer 20 and a thiourethane layer 10 can be inhibited, during being winded of a film 100 to be a roll shape.

Specifically, when a thiourethane layer 10 and a base layer 20 is in direct contact, a stress difference value formed between the thiourethane layer 10 and the base layer 20 of a film in a state of being winded may be adjusted within a predetermined range. Thereby delamination occurrence can be substantially prevented between the thiourethane layer 10 and the base layer 20.

A value of subtracting a modulus of a base layer 20 from a modulus of a thiourethane layer 10 may be 0.1 to 299 kgf/mm$^2$. A value of subtracting a modulus of a base layer 20 from a modulus of a thiourethane layer 10 may be 0.3 to 250 kgf/mm$^2$. A value of subtracting a modulus of a base layer 20 from a modulus of a thiourethane layer 10 may be 0.5 to 200 kgf/mm$^2$. In such a case, defect occurrence can be prevented in a film during a winding process or storing of the winded film.

A base layer 20 and a thiourethane layer 10 may have an 8 kgf/cm or more bonding strength. A base layer 20 and a thiourethane layer 10 may have 12 kgf/cm or more bonding strength. A base layer 20 and a thiourethane layer 10 may have a bonding strength of 15 kgf/cm or more. A base layer 20 and a thiourethane layer 10 may have a bonding strength of 50 kgf/cm or less. A base layer 20 and a thiourethane layer 10 may have a bonding strength of 40 kgf/cm or less. A base layer 20 and a thiourethane layer 10 may have a bonding strength of 30 kgf/cm or less. In such a case, optical defect formation caused by delamination between a base layer 20 and a thiourethane layer 10 can be substantially prevented in a film 100.

Bonding strength of a base layer 20 and a thiourethane layer 10 may be measured through a 90° peel test described in ASTM D6862-11.

Figure 3:
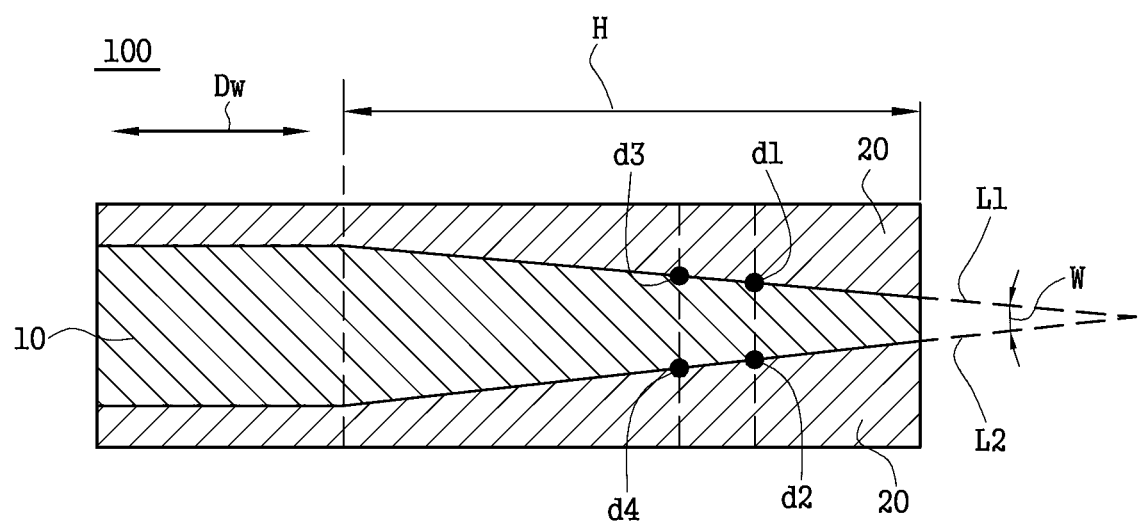
FIG. 3 is a conceptual view illustrating a HUD area and a W value.
Figure 4:
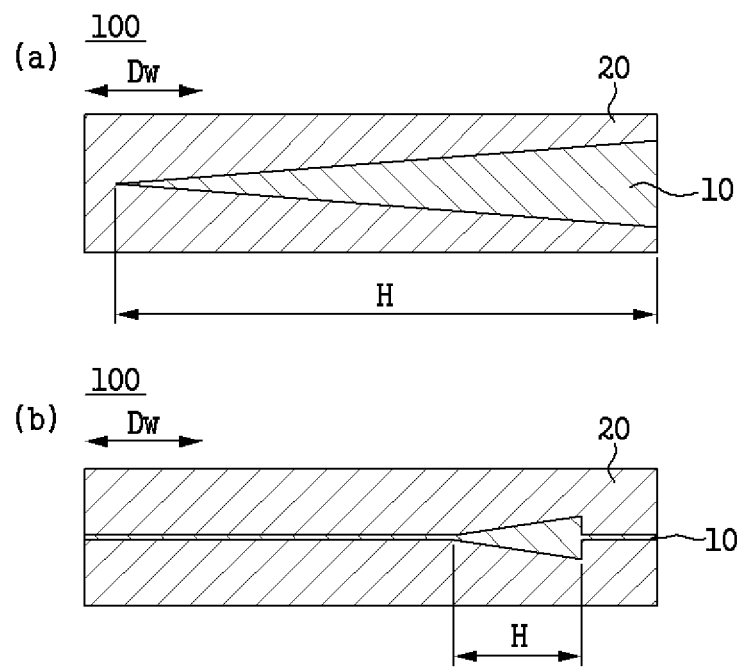
FIGS. 4 to 6 are conceptual views illustrating a film including a HUD area in accordance with other embodiments of the present application.
Figure 5:
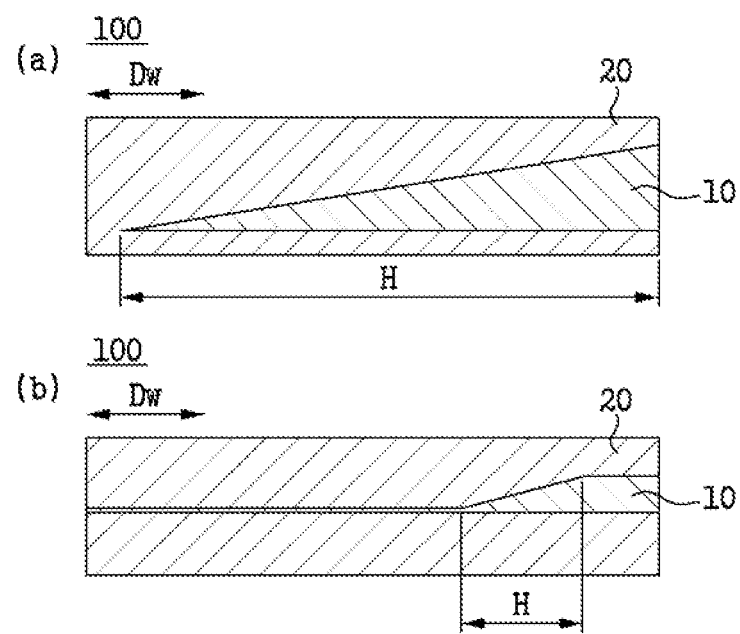
Figure 6:
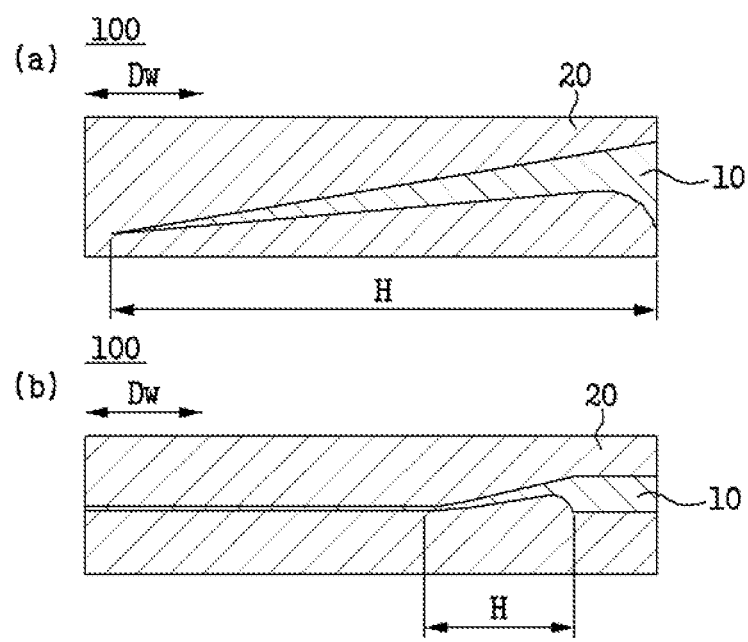

FIG. 3 is a conceptual view for illustrating a HUD area H and a W value of a film 100 in accordance with another embodiment. FIGS. 4 to 6 are conceptual views for illustrating a film for bonding comprising a HUD area according to other embodiments. Hereinafter, referring to FIG. 3 to FIG. 6, below example embodiments will be described in detail.

HUD Area H

A film 100 may comprise a HUD area H having a functionality of preventing double image formation.

A HUD area is an area where a light is projected by an external HUD projector.

A HUD area H is an area where a double image referred as a ghost image is alleviated or prevented when a light emitted from an external HUD projector is projected.

A HUD area H may be formed in the whole of a film 100.

A HUD area H may be formed in part of a film 100.

A HUD area H may have a substantially even thickness in a width direction Dw of a film 100.

A HUD area H may be formed from an edge in a width direction Dw of a film 100 to a position distanced from the edge by about 6 cm or more. The HUD area H may be formed to have an even thickness.

A HUD area H having substantially even thickness in a width direction of a film 100 means that a difference value between an average thickness of a film 100 measured in an entire HUD area H and a thickness of a film for bonding 100 measured at one point of a HUD area H is within a predetermined range. Specifically, when an average thickness of a film 100 in an entire HUD area H is designated as 100%, an average thickness of a film 100 in an entire HUD area H and a thickness of a film 100 measured at one point of a HUD area H may have a difference value of 10% or less. The difference value may be 5% or less. The difference value may be 2% or less.

A HUD area H may be formed to have a width of 10 cm or more by being started in a position distanced by about 6 cm or more from one edge of a film 100 in a width direction Dw of a film 100. A HUD area H may be formed to have a width of 20 cm or more by being started in a position distanced by about 6 cm or more from one edge of a film 100 in a width direction Dw of a film 100. A HUD area H may be formed to have a width of 35 cm or more by being started in a position distanced by about 6 cm or more from one edge of a film 100 in a width direction Dw of a film 100. A HUD area H may be formed to have a width of 100 cm or less by being started in a position distanced by about 6 cm or more from one edge of a film 100 in a width direction Dw of a film 100. A HUD area H may be formed to have a width of 40 cm or less by being started in a position distanced by about 6 cm or more from one edge of a film 100 in a width direction Dw of a film 100.

A HUD area H may be disposed in an area from a position apart from a first edge by about 10 cm in a width direction Dw of a film 100, to a position apart from a first edge by 80 cm in a width direction Dw of a film 100, and may be disposed in the entire or part of the area.

A thiourethane layer 10 as a high refractive layer comprises a first surface and a second surface facing the first surface.

A HUD area H may comprise a wedge area where the first surface and the second surface of the thiourethane layer 10 are not parallel from each other.

A HUD area H may have a thickness variation value of $4.36*10^{-4}$ cm or more per 1 cm in a film 100 in a width direction Dw of a thiourethane layer 10 and/or a base layer 20.

A wedge section may allow a reflected light reflected on a surface of a thiourethane layer 10 to reach an eye of an observer, when a light is incident to a surface of a thiourethane layer 10 from a HUD projector. At the same time, a wedge area may adjust a route of a refracted light to be refracted in a first surface of a thiourethane layer 10 and reflected in a second surface, which is not parallel to the first surface, and may allow the refracted light refracted again in the first surface to reach an eye of an observer. Thus, the wedge section may not help to generate a double image that can be recognized by an observer.

A first point d1 and a third point d3 are points respectively placed on a first surface of a thiourethane layer 10 in a HUD area H.

A second point d2 and a fourth point d4 are points respectively placed on a second surface of a thiourethane layer 10 in a HUD area H.

A third point d3 may be placed to be distanced from a first point d1 by 1 cm in a width direction Dw. A first point d1 and a second point d2 may be placed on the same line in a thickness direction of a film 100. A third point d3 and a fourth point d4 may be placed on the same line in a thickness direction of a film 100.

An extension line passing a first point d1 and a third point d3 is a first line L1, an extension line passing a second point d2 and a fourth point d4 is a second line L2, and an angle formed by the first line L1 and the second line L2 in a contact point of the first line L1 and the second line L2 is W.

W has an even or uneven value in a wedge section, and the value is not 0.

A wedge section comprises a portion whose W is 0.01 to 1.2 degrees.

A thickness of a thiourethane layer 10 in a point where a first end or a second end of a wedge section is placed, may be smaller than a distance between a first surface and a second surface of a film 100 in the point where the first end or the second end of the wedge section is placed. In such a case, a HUD image light projected to a wedge section may be refracted and reflected at a proper angle, thereby inhibiting double image formation. Additionally, a thickness of a film 100 in a width direction can be adjusted within the desired range.

A first point d1 is placed on the first surface of a thiourethane layer 10 in a wedge section, and the location is not limited.

A third point d3 is placed at a point distanced from a first point d1 by 1 cm in a width direction Dw of a film 100. When a point distanced from a first point d1 by 1 cm in one direction out of width directions of a film 100 corresponds to the external of a HUD area, the location of a third point d3 is a position distanced from a first point d1 by 1 cm in the opposite direction of the one direction out of width directions of a film 100.

In a HUD area H, W may be an even value in a width direction Dw of a film 100.

In such a case, the sectional shape of a wedge area may be substantially a trapezoid or a triangle. Specifically, when the sectional shape of a wedge section is substantially a triangle, the triangle may be an isosceles triangle, a right triangle, or the like, and may be specifically an isosceles triangle (refer to FIG. 4 and FIG. 5).

In a HUD area H, W may be a value increasing as heading to a second end portion from a first end portion in a width direction Dw of a film 100. In a HUD area H, W may be a value decreasing as heading to the second end portion from the first end portion in a width direction Dw of a film 100. In such a case, the sectional shape of a wedge section may be substantially a trapezoid or a triangle, however, a line corresponding to a first surface or a second surface of thiourethane layer 10 may be convex or concave (refer to FIG. 6).

For example, when the wedge area comprises an arc shape of a circle or an oval in part thereof, the arc comprised in the wedge area may be disposed to be in contact with a base line of the triangle shape or to be close to the base line, and may have a shape excepting for a portion of discontinuity between an apex and an arc shape distinguished by a tangent line where the apex in a triangle shape and the arc meet.

For example, when the wedge area comprises an arc shape of a circle or an oval in part thereof, the arc comprised in the wedge area may be disposed to be in contact with a base line of the trapezoid shape or to be close to the base line, and may have a shape excepting for a portion of discontinuity between the trapezoid shape and the arc shape distinguished by a tangent line where a virtual point crossing with an extension line of a side plane of the trapezoid shape and the arc meet.

A wedge section may comprise a portion whose W is 0.05 to 1.2 degrees as an even or uneven value. A wedge section may comprise a portion whose W is 0.07 to 1.1 degrees as an even or uneven value. A wedge section may comprise a portion whose W is 0.08 to 1.0 degrees as an even or uneven value. In such a case, the formation of a ghost image of a HUD image can be inhibited in a wedge section.

A base layer 20 may have a shape in which one of the first surface and the second surface corresponds to the thiourethane layer 10. For example, when a thickness of a thiourethane layer 10 increases in a width direction Dw of a film 100 to have W of about 1 degree in a wedge section, a thickness of a base layer 20 decreases in a width direction Dw of a film 100 to have W of about −1 degree, and thereby a thickness variation can be decreased in a width direction Dw of a film 100 overall. In addition, when a first base layer 20 and a second base layer 20 are respectively disposed on a first surface and a second surface of a thiourethane layer 10, respective thicknesses of a first base layer 20 and a second base layer 20 may be decreased in a width direction Dw of a film 100 to have W values of about −0.5 degrees, and to correspond to a thickness increase of a thiourethane layer 10 in a width direction Dw of a film 100 having W of about 1 degree in a wedge section. Thereby a thickness variation of the film 100 in a width direction Dw can be decreased in a film 100 overall.

By such a disposition of base layers 20, a film 100 having an internal wedge shape in which a thiourethane layer 10 as a high refractive layer is disposed inside a base layer 20 can be provided.

Properties of Film

A film 100 in accordance with another embodiment of the present application may comprise a thiourethane layer 10 comprising a thiourethane-based repeat unit and a base layer 20 disposed on a surface of the thiourethane layer 10 and comprising a plasticizer.

Detailed descriptions of properties, ingredients, a thiourethane-based repeating unit, and the like of a thiourethane layer 10 comprised in a film 100 are overlapped with the above description, and thus the further description is omitted.

A thiourethane layer 10 may have a plasticizer absorbing amount less than 3% of the weight of the thiourethane layer 10.

A base layer 20 and a thiourethane layer 10 may be formed to be in direct contact with each other inside a film 100. A base layer 20 and a thiourethane layer 10 may be disposed to contact each other in part or the whole of the base layer 20 and thiourethane layer 10. A base layer 20 may comprise a plasticizer with a polyvinyl acetal repeating unit together.

The inventors experimentally verified that a plasticizer of a base layer 20 could affect a high refractive index characteristic of a thiourethane layer 10.

Specifically, a plasticizer is applied to regulate the flexibility of a base layer 20. However, a plasticizer does not stay only in the base layer 20, and migration of the plasticizer between layers can occur due to various reasons such as external temperature and pressure and a characteristic of an applied polyvinyl acetal. In addition, it was experimentally confirmed that migration of a plasticizer between a base layer 20 and a high refractive layer might also occur.

When a plasticizer comprised in a base layer 20 is migrated to a thiourethane layer 10, the plasticizer may affect a refractive index of the thiourethane layer 10 itself. Besides, this can degrade a function of preventing double image formation of a film 100 applied with a thiourethane layer 10.

Accordingly, applying one which does not substantially absorb a plasticizer or whose absorbing degree is small as a thiourethane layer 10 of example embodiments is preferable. A thiourethane layer 10 can lower a plasticizer absorbing rate by comprising a thiourethane-based repeating unit described in the above.

A thiourethane layer 10 may have a plasticizer absorbing amount which is less than about 3 wt %, about 2 wt % or less, or about 1 wt % or less of the weight of the thiourethane layer 10. On the other hand, a thiourethane layer 10 may have a plasticizer absorbing amount of 0 wt % or more, or 0.001 wt % or more of the weight of the thiourethane layer 10. In such a case, degradation of a refractive index of a thiourethane layer 10 caused by plasticizer absorption of a thiourethane layer 10 can be substantially inhibited, and a double image inhibiting effect can be maintained in a long time.

A test for plasticizer absorbing amount of a thiourethane layer 10 keeps a thiourethane layer 10 laminated between two sheets of polyvinyl acetal films comprising a plasticizer for 4 weeks at 50° C., and evaluates a degree of weight increase of the thiourethane layer 10 sample before and after the keeping. A weight-increasing amount is evaluated as % based on the weight of a thiourethane layer 10 before the test and shown as wt %.

A film 100 may additively comprise a functional layer in addition to a thiourethane layer 10 and a base layer 20. The functional layer may be a sound-insulating layer.

A sound-insulating layer may be disposed between a thiourethane layer 10 and a base layer 20. A sound-insulating layer may be disposed on a surface of a base layer 20. A sound-insulating layer may be disposed inside a base layer 20.

A sound-insulating layer may comprise a polyvinyl acetal resin.

A sound-insulating layer may comprise a polyvinyl acetal resin in an amount of 54 wt % to 76 wt %, or 60 wt % to 70 wt %.

A sound-insulating layer may comprise a plasticizer in an amount of 24 wt % to 46 wt %, or 30 wt % to 40 wt %.

The polyvinyl acetal resin comprised in a sound-insulating layer may have an acetyl group in an amount of 8 wt % or more, and specifically 8 wt % to 30 wt % based on an entire polyvinyl acetal resin. Also, the polyvinyl acetal resin comprised in a sound-insulating layer may have a hydroxyl group in an amount of 26 wt % or less, or 5 wt % to 25 wt %. In such a case, it is possible to achieve a more stable sound-insulating characteristic in a film 100.

Composition for Manufacturing Thiourethane Layer

A composition for manufacturing a thiourethane layer in accordance with another embodiment of the present application comprises a polyfunctional compound and an isocyanate-based compound.

A polyfunctional compound comprises a thiol-based compound and/or a polyol compound comprising two or more hydroxyl groups or thiol groups.

A thiol-based compound comprises a heterocyclo-alkanediyl group having carbon atoms of 4 to 10 and sulfur atoms of 1 to 5.

A thiol-based compound may comprise a heterocyclo-alkenediyl group having carbon atoms of 4 to 10 and sulfur atoms of 1 to 5. A heterocyclo-alkenediyl group refers to a group made from the heterocyclo-alkanediyl group through substitution from one to three single bonds between carbon and carbon to double bonds between carbon and carbon.

A heterocyclo-alkanediyl-based repeat unit may be a heterocyclo-alkanediyl having carbon atoms of 4 to 10 and sulfur atoms of 1 to 5. A heterocyclo-alkanediyl-based repeat unit may be a heterocyclo-alkanediyl having carbon atoms of 4 to 9 and sulfur atoms of 2 to 5.

A heterocyclo-alkenediyl-based repeat unit may be a heterocyclo-alkenediyl having carbon atoms of 4 to 10 and sulfur atoms of 1 to 5. A heterocyclo-alkenediyl-based repeat unit may be a heterocyclo-alkenediyl having carbon atoms of 4 to 9 and sulfur atoms of 2 to 5.

For example, a heterocyclo-alkenediyl may comprise 1,4-dithiacyclohex-2-ene or 1,4-dithiacyclohex-4-ene group.

An isocyanate-based compound comprises a linear aliphatic polyvalent isocyanate compound having two or more isocyanate groups.

A linear aliphatic polyvalent isocyanate compound comprises an alkanediyl having carbon atoms of 4 to 10.

A linear aliphatic polyvalent isocyanate compound may comprise an alkenediyl having carbon atoms of 4 to 10. A linear alkenediyl having carbon atoms of 4 to 10 is a repeat unit made from a linear alkanediyl-based repeat unit having carbon atoms of 4 to 10 through substitution from one to three single bonds between carbon and carbon to double bonds between carbon and carbon. For example, an alkenediyl-based repeat unit may be 2-hexenediyl-based repeat unit or 3-hexenediyl-based repeat unit.

A heterocyclo-alkanediyl group may comprise a dithiane functional group. A heterocyclo-alkanediyl group may comprise 1,2-dithiane functional group. A heterocyclo-alkanediyl group may comprise 1,3-dithiane functional group. A heterocyclo-alkanediyl group may comprise 1,4-dithiane functional group. For example, the heterocyclo-alkanediyl-based repeat unit may be methyldithiane functional group, dimethyldithiane functional group, ethylmethyldithiane functional group, or diethyldithiane functional group.

A thiol-based compound functions as regulating a refractive index of a thiourethane layer 10 when a thiourethane layer 10 is formed through polymerization of a composition for manufacturing a thiourethane layer. Additionally, a thiol-based compound may regulate the flexibility of a thiourethane layer 10 and improve the workability of a film comprising the thiourethane layer 10.

A polyol compound may comprise an alkanediyl group having carbon atoms of 2 to 10. A polyol compound may be a polyether polyol comprising an alkanediyl group having carbon atoms of 2 to 10.

An isocyanate-based compound may comprise a linear aliphatic polyvalent isocyanate compound having two or more isocyanate groups. An isocyanate-based compound may comprise a cyclo-aliphatic polyvalent isocyanate compound having two or more isocyanate groups. A cyclo-aliphatic polyvalent isocyanate compound may comprise one or more cyclo-alkanediyl group.

A composition for manufacturing a thiourethane layer may comprise a thiol-based compound in an amount of 50 to 97 mol % based on a polyfunctional compound in an amount of 100. A composition for forming a thiourethane layer may comprise a thiol-based compound in an amount of 60 to 95 mol % based on a polyfunctional compound in an amount of 100. A composition for forming a thiourethane layer may comprise a thiol-based compound in an amount of 65 to 93 mol % based on a polyfunctional compound in an amount of 100. In such a case, a thiourethane layer 10 formed through a composition for manufacturing a thiourethane layer has a regulated refractive index and helps to inhibit double image formation of a HUD image through a film 100 comprising the thiourethane layer 10.

A polyol compound may comprise a polyether polyol having a number-average molecular weight of 100 to 1,000. A polyol compound may comprise a polyether polyol having a number-average molecular weight of 120 to 900. A polyol compound may comprise a polyether polyol having a number-average molecular weight of 140 to 800. In such a case, a thiourethane layer 10 having regulated flexibility through a composition for manufacturing a thiourethane layer can be formed.

A composition for manufacturing a thiourethane layer may comprise a thiol-based compound and an isocyanate-based compound in a mole ratio of 1:0.7 to 1.3. A composition for manufacturing a thiourethane layer may comprise a thiol-based compound and an isocyanate-based compound in a mole ratio of 1:0.8 to 1.2. A composition for manufacturing a thiourethane layer may comprise a thiol-based compound and a linear aliphatic isocyanate compound in a mole ratio of 1:0.7 to 1.3. A composition for manufacturing a thiourethane layer may comprise a thiol-based compound and a linear aliphatic isocyanate compound in a mole ratio of 1:0.8 to 1.2. In such a case, a thiourethane layer 10 formed through the composition for manufacturing a thiourethane layer helps inhibit double image formation of a HUD image and has regulated flexibility, thereby improving workability in winding and subsequent processes.

A composition for manufacturing a thiourethane layer may comprise the thiol-based compound in a mole ratio of 55 to 120, based on the sum 100 of an amount of an isocyanate-based compound and an amount of the polyether polyol. A composition for manufacturing a thiourethane layer may comprise the thiol-based compound in a mole ratio of 65 to 110, based on the sum 100 of an amount of a polyvalent isocyanate-based compound and an amount of the polyether polyol. A composition for manufacturing a thiourethane layer may comprise the thiol-based compound in a mole ratio of 55 to 120, based on the sum 100 of an amount of a linear aliphatic isocyanate compound and an amount of the polyether polyol. A composition for manufacturing a thiourethane layer may comprise the thiol-based compound in a mole ratio of 65 to 110, based on the sum 100 of an amount of a linear aliphatic isocyanate-based compound and an amount of the polyether polyol. In such a case, a thiourethane layer 10 formed through the composition for manufacturing a thiourethane layer may have a refractive index regulated within a desired range, and a modulus regulated to be suitable for a winding process.

A composition for manufacturing a thiourethane layer may comprise a catalyst. By applying a catalyst, the rate of formation reaction of a thiourethane resin can be increased. A catalyst functions as increasing the rate of polycondensation reaction generated between an isocyanate group and a hydroxyl group, or between an isocyanate group and a thiol group in a mixture.

The catalyst may be a tin-based compound. The catalyst may be, for example, DMDC (Dimethyltin dichloride) or DBDC (Dibuthyltin dichloride). However, the present application is not limited thereto.

A composition for manufacturing a thiourethane layer may comprise a catalyst in an amount of 50 to 1,000 ppm. A composition for manufacturing a thiourethane layer may comprise a catalyst in an amount of 100 to 900 ppm. A composition for manufacturing a thiourethane layer may comprise a catalyst in an amount of 200 to 800 ppm. In such a case, the time for synthesizing the reaction of a thiourethane resin can be shortened.

Manufacturing Method

Hereinafter, detailed descriptions of a thiourethane resin and a film will be made.

Manufacturing Method for Thiourethane Resin

A manufacturing method for a thiourethane resin comprises a reacting operation of inducing reaction of an isocyanate group and a hydroxyl group or an isocyanate group and a thiol group in a composition for manufacturing a thiourethane layer comprising an isocyanate-based compound and a polyfunctional compound and thereby preparing a reaction solution, and an aging operation of reacting of the reaction solution at an aging temperature of 100 to 150° C. to manufacture a thiourethane resin.

The composition for manufacturing the thiourethane layer is overlapped with the above description and thus omitted.

A formation reaction rate can be increased by putting a catalyst into a composition for manufacturing a thiourethane layer. The catalyst functions as increasing a rate of polycondensation reaction occurs between an isocyanate group and a hydroxyl group or between an isocyanate group and a thiol group in a mixture.

The catalyst may be a tin-based compound. The catalyst is for example, DMDC (Dimethyltin dichloride) or DBDC (Dibuthyltin dichloride). However, the present application is not limited thereto.

A reacting operation may be performed by a melt polymerization. Specifically, the catalyst may be put into a solution in which an isocyanate-based compound is mixed, in an amount of 50 to 1,000 ppm, and thereby can manufacture an isocyanate-based solution.

A polyfunctional compound may be heated to 40 to 180° C. in the presence of an atmosphere gas such as $N_2$ and thereby can manufacture a polyfunctional compound melt solution. An isocyanate-based solution may be dropped into a polyfunctional compound melt solution to induce a polycondensation reaction between an isocyanate group and a hydroxyl group or between an isocyanate group and a thiol group, and thereby can prepare a reaction solution. A reacting operation may proceed for 10 to 360 minutes.

After the reacting operation, reaction of the reaction solution may be performed at an aging temperature of 100 to 150° C. to make a thiourethane resin. Specifically, a reaction solution after the reacting operation may be dropped into a tray which is a Teflon material or processed by plating treatment. The tray containing the reaction solution may be placed in an oven regulated to have 100 to 150° C. for 4 to 20 hours for operating aging. In such a case, the reaction of a manufactured thiourethane resin may be sufficiently induced and a resin with stable properties overall can be achieved.

A manufactured thiourethane resin may have a number-average molecular weight of 5,000 to 500,000. The number-average molecular weight may be 6,000 to 450,000. The number-average molecular weight may be 7,000 to 400,000. In such a case, the polymerization degree of a polyfunctional compound and a diisocyanate-based compound may be regulated and desired properties of a thiourethane resin can be achieved.

A manufactured thiourethane resin may comprise a heterocyclo-alkanediyl-based repeat unit and a linear alkanediyl-based repeat unit. Specifically, a heterocyclo-alkanediyl-based repeat unit may be a repeat unit indicated by below Formula 1, and a linear alkanediyl-based repeat unit may be a repeat unit indicated by below Formula 2.

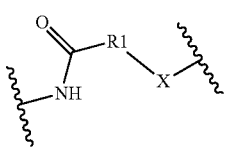

[Formula 1]

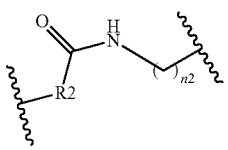

[Formula 2]

In the Formula 1, R1 is —O— or —S—, and X is a heterocyclo-alkanediyl group having carbon atoms of 3 to 10 and sulfur atoms of 1 to 5. And in Formula 2, R2 is —O— or —S—, and n2 is an integer of 4 to 10.

The thiourethane resin may be stored by being a pellet shape or a chip shape after the synthesis, and may be applied to the manufacture of a thiourethane layer 10 or a high refractive layer.

Manufacturing Method for Film and Manufacturing Method for Film for Bonding

A manufacturing method for a film comprises a preparing operation of putting a thiourethane resin comprising a thiourethane-based repeat unit indicated by Formula 1 and an alkanediyl-based repeat unit indicated by the Formula 2 into an extruder. A shape forming operation of extruding the thiourethane resin inside the extruder having a temperature maintained to be an extruding temperature of 120 to 200° C. to manufacture a thiourethane layer 10, thereby manufacturing a film comprising a thiourethane layer 10.

In the preparing operation, a description of a repeat unit comprised in a thiourethane resin is overlapped with the above description and thus omitted.

A thiourethane resin may be one processed by chopping to be easily put into an extruder.

After a thiourethane resin is put into an extruder, a temperature inside an extruder may be maintained at 120 to 200° C. to extrude the thiourethane resin and manufacture a thiourethane layer 10. A twin-screw extruder may be applied as an extruder. A single-screw extruder may be applied as an extruder.

A thiourethane layer 10 may be manufactured as a sheet shape by extruding a thiourethane resin and shaping the extruded thiourethane resin through a T-DIE or the like. Specifically, a thiourethane layer 10 may be shaped by adjusting angles of a first surface and a second surface of a thiourethane layer 10 to have a wedge angle described in the above.

A thiourethane layer 10 may be manufactured by a co-extrusion method with a base layer 20 described in the above.

When the film is manufactured by a co-extrusion method, a resin applied to a base layer 20 and a resin applied to a thiourethane layer 10 are respectively put into two or more extruders and a film may be manufactured to have respective layers in desired shapes.

When a polyvinyl acetal layer mixed with a plasticizer is applied as a base layer 20, it may be extruded while a temperature ordinarily applied to a polyvinyl acetal layer is maintained. Additives may be further applied as needed.

In this time, a laminating means such as a feed block may be further applied to the front end of a T-DIE.

A film 100 may be manufactured by a hot press method. A thiourethane layer 10 may be separately manufactured through an extruder. In addition, a thiourethane layer 10 may be separately manufactured by using a mold. Specifically, a thiourethane resin is put into a mold in a wedge shape having a wedge angle described in the above, hot pressing of the thiourethane resin is performed, and thereby a thiourethane layer 10 can be manufactured.

A base layer 20 may be separately manufactured through an extruder. A resin composition applied to a base layer 20 is put into an extruder and extruded to have a desired shape, and thereby a base layer 20 can be manufactured. A base layer 20 may be extruded while a temperature ordinarily applied to a polyvinyl acetal layer is maintained, when a polyvinyl acetal layer mixed with a plasticizer is applied, as the same as one manufactured by the co-extrusion method. Additives may be further applied to a base layer 20 as needed.

The manufactured thiourethane layer 10 and base layer 20 may be laminated in order of base layer 20/thiourethane layer 10/base layer 20, and heated and compressed with a hot press, and thereby a film for bonding can be manufactured. A temperature when hot pressing is performed may be 120 to 180° C.

Descriptions of the shape, composition, and the like of respective layers are overlapped with the above description, and thus the further description is omitted.

Manufacturing methods of a thiourethane layer 10, a film, and a film for bonding are not limited to the above method.

When a film 100 applied as a film for bonding is laminated between a couple of light-transmitting layers and a bonding process thereof is performed, a pattern may be transferred on the surface of a film 100 to improve the de-airing performance of a film 100. As a method of transferring a pattern, a method using a pattern roller and a method using a pattern mold are present, but the method is not limited thereto.

A film formed in this manner may be laminated between a couple of light-transmitting layers and can form a light-transmitting laminate. A light-transmitting laminate may be manufactured by applying a pre-bonding process and a main-bonding process in order or at the same time.

Light Transmitting Laminate

A light-transmitting laminate in accordance with another embodiment disclosed in the present application comprises a first light-transmitting layer (not shown), a film 100 disposed on a surface of the first light-transmitting layer, and a second light-transmitting layer (not shown) disposed on the film.

The first light-transmitting layer and the second light-transmitting layer may be respectively a light-transmitting glass or a light-transmitting plastic.

A film described in the above is applied as the film, and the detailed description thereof is overlapped with the above description and thus omitted.

Vehicle

A vehicle in accordance with another embodiment disclosed in the present application comprises a light-transmitting laminate described in the above. The vehicle comprises a body forming the main body of the vehicle, a driver (engine, etc.) equipped in the body, a driving wheel (wheel, etc.) equipped in the body to be rotatable, a connecting unit connecting the driving wheel and the driver, and a windshield which is a light-transmitting laminate equipped in some of the body to block winds from the external.

Hereinafter, detailed embodiments will be described in further detail. In descriptions below of experiments, a case on % described without being obvious whether the unit is wt % or mol % refers to wt %.

Manufacturing Example: Composition for Manufacturing Thiourethane Layer and the Manufacture of Thiourethane Layer Manufacture of Thiourethane Resin When a weight of an entire polyfunctional compound was designated as 100 parts by weight, a polyfunctional compound in which BMMD (2,5-Bis(mercaptomethyl)-1,4-dithiane) of 75 parts by weight and PEG400 (Poly(ethylene glycol), mw400) of 25 parts by weight were mixed was prepared. Likewise, when a weight of an entire isocyanate-based compound was designated as 100 parts by weight, an isocyanate-based compound in which H12MDI (Hydrogenated Methylendiphenyl-4,4'-diisocyanate) of 20 parts by weight and HDI (Hexamethylene diisocyanate) of 80 parts by weight were mixed was prepared.

DMDC (Dimethyltin dichloride) in an amount of 50 to 500 ppm was added into the isocyanate-based compound as a catalyst.

The polyfunctional compound was heated to 40 to 180° C. to be melted in an $N_2$ atmosphere. Thereafter, the isocyanate-based compound was dropped into the melted polyfunctional compound in a mole ratio of 1:1, a reacting operation proceeded for 120 minutes, and thereby a reaction solution was achieved.

The reaction solution was moved into a Teflon tray, an aging operation which was operating an aging for 4 to 20 hours in an oven at 100 to 150° C. was performed, and a thiourethane resin was obtained through chopping.

Manufacture of Resin Composition for Base Layer

Polyvinyl Butyral Resin: PVA having a polymerization degree of 1700 and a saponification degree of 99, and n-BAL were added, an ordinary synthesizing process was performed, and a polyvinyl butyral resin having a hydroxyl group of 20.3 wt %, a butyral group of 78.9 wt %, and an acetyl group of 0.8 wt % was obtained.

Manufacture of Additive: Irganox 1076 as an antioxidant of 0.1 parts by weight, Tinuvin-328 as a UV absorber of 0.2 parts by weight, Mg Acetate as a bonding strength regulator of 0.03 parts by weight were blended and mixed to be sufficiently dispersed in a tumbler (The sum was 0.33 parts by weight).

Manufacture of Thiourethane Layer and Film

Example 1: The manufactured thiourethane resin was filled in a mold in a wedge shape and heated and shaped with a hot press whose temperature was applied to be 120 to 180° C., thereby manufacturing a thiourethane layer B. The manufactured thiourethane layer B had a first end whose thickness was 20 μm, a second end whose thickness was 760 μm, and W of 0.14 degrees.

Additionally, a polyvinyl butyral resin composition comprising the manufactured polyvinyl butyral resin of 72.67 wt %, 3G8 as a plasticizer of 27 wt %, and an additive of 0.33 wt % was put into an extruder to be extruded, and thereby manufactured a base layer A in a sheet shape. Thereafter, the manufactured base layer A and thiourethane film layer B were laminated in a form of A layer/B layer/A layer, and shaped with a hot press to manufacture a film having total thickness of 780 μm.

Example 2: While manufactured under the same conditions as Example 1, when a weight of an entire isocyanate-based compound was designated as 100 parts by weight, H12MDI of 30 parts by weight, and HDI of 70 parts by weight were applied.

Example 3: While manufactured under the same conditions as Example 1, when a weight of an entire polyfunctional compound was designated as 100 parts by weight, BMMD of 92 parts by weight and PEG400 of 8 parts by weight were applied, and HDI was applied alone as an entire isocyanate-based compound.

Comparative Example 1: While manufactured under the same conditions as Example 1, when a weight of an entire polyfunctional compound was designated as 100 parts by weight, BMMD of 80 parts by weight and PEG400 of 20 parts by weight were applied, and when a weight of an entire isocyanate-based compound was designated as 100 parts by weight, HXDI (Hydrogenated m-xylene diisocyanate[1,3-Bis(isocyanatomethyl)cyclohexane]) of 50 parts by weight and H12MDI of 50 parts by weight were applied, and DMDC of 200 ppm was applied.

Comparative Example 2: While manufactured under the same conditions as Example 1, when a weight of an entire polyfunctional compound was designated as 100 parts by weight, BMMD of 60 parts by weight and PEG400 of 40 parts by weight were applied, and when a weight of an entire isocyanate-based compound was designated as 100 parts by weight, HXDI of 50 parts by weight and H12MDI of 50 parts by weight were applied, and DMDC of 200 ppm was applied.

Comparative Example 3: While manufactured under the same conditions as Example 1, when a weight of an entire polyfunctional compound was designated as 100 parts by weight, BMMD of 70 parts by weight and PEG400 of 30 parts by weight were applied, and when a weight of an entire isocyanate-based compound was designated as 100 parts by weight, HXDI of 20 parts by weight and H12MDI of 80 parts by weight were applied, and DMDC of 200 ppm was applied.

Comparative Example 4: While manufactured under the same conditions as Example 1, when a weight of an entire polyfunctional compound was designated as 100 parts by weight, BMMD of 40 parts by weight and PEG400 of 60 parts by weight were applied, and when a weight of an entire isocyanate-based compound was designated as 100 parts by weight, HXDI of 20 parts by weight and H12MDI of 80 parts by weight were applied, and DMDC of 200 ppm was applied.

Evaluating Example: Evaluation of Properties

Measurement of Modulus

A Value of modulus of thiourethane layer samples of Examples and Comparative Examples was measured by using UTM 5566A model available from INSTRON. A value of modulus was measured at room temperature in accordance with a method prescribed in ISO 527-3.

When a value of modulus of Examples and Comparative Example was 300 kgf/mm$^2$ or less, it was judged as O, and when the value was more than 300 kgf/mm$^2$, it was judged as X.

The result by Examples and Comparative Examples was shown in below Table 2.

Measurement of Refractive Index

Refractive index of thiourethane layers by Examples and Comparative Examples was measured by using DR-M4 model available from ATAGO. Specifically, a measuring wave was set to be 589.29 nm (D line) and a measuring temperature was set to be 20° C., and after that the thiourethane layer samples were placed in a measuring rack, and the refractive index was measured.

The result by Examples and Comparative Examples was shown in below Table 2.

Measurement of Plasticizer Absorbing Rate

A thiourethane layer was manufactured by the same method as the above manufacturing method for a thiourethane layer of Examples and Comparative Examples; however, the thiourethane layer sample was manufactured one by one to have width*length of 15*15 mm and a thickness of 100 μm. Also, base layer samples were manufactured two sheet for an Example and a Comparative Example respectively to have width*length of 25*25 mm and a thickness of 100 μm by having the same composition as the resin composition for a base layer described in the above manufacturing method for a film.

The thiourethane layer sample was laminated between two sheets of base layer samples of Examples and Comparative Examples, kept for 4 weeks at 50° C., and after that an increasing amount of the weight of a thiourethane layer sample was measured. When an increasing amount of the weight after keeping was 2% or less compared to the weight of a thiourethane layer before the keeping, it was evaluated as Pass, and when the increasing amount of the weight was more than 2%, it was evaluated as Fail, and the result was described in below Table 2.

Evaluation of Bonding Strength

A thiourethane layer was manufactured by the same method as the above manufacturing method for a thiourethane layer of Examples and Comparative Examples; however, the thiourethane layer sample was manufactured a sheet for an Example and a Comparative Example respectively to have width*length of 150*25 mm. Also, a base layer sample was manufactured one by one to have width*length of 150*25 mm by having the same composition as the resin composition for a base layer described in the above manufacturing method for a film.

Base layer samples of Examples and Comparative Examples were arranged on glass plates, thiourethane layer samples of Examples and Comparative Examples were arranged on the base layer samples, after that aluminum foils with a thickness of 150 μm were arranged on the thiourethane layer samples, and lamination of compressing for 10 minutes at 150° C. and 1 atmospheric pressure was performed.

Thereafter, a laminated sample was attached and fixed on a measuring rack, a force in 90° direction from the ground was added to an end portion of a thiourethane layer of the laminated sample. In this time, if delamination between a glass and a base layer occurred first, it was evaluated as Pass, if delamination between a base layer and a thiourethane layer occurred first, it was evaluated as Fail, and the result was described in below Table 2.

TABLE 1

|  | BMMD (Parts by Weight) | PEG400 (Parts by Weight) | HXDI (Parts by Weight) | H12MDI (Parts by Weight) | HDI (Parts by Weight) | DMDC (ppm) |
| --- | --- | --- | --- | --- | --- | --- |
| Example 1 | 75 | 25 | — | 20 | 80 | 500 |
| Example 2 | 75 | 25 | — | 30 | 70 | 500 |
| Example 3 | 92 | 8 | — | — | 100 | 500 |
| Comparative Example 1 | 80 | 20 | 50 | 50 | — | 200 |
| Comparative Example 2 | 60 | 40 | 50 | 50 | — | 200 |
| Comparative Example 3 | 70 | 30 | 20 | 80 | — | 200 |
| Comparative Example 4 | 40 | 60 | 20 | 80 | — | 200 |

In Table 1, parts by weight of BMMD or PEG400 refers to parts by weight when a weight of an entire a polyfunctional compound is designated as 100 parts by weight, and parts by weight of HXDI, H12MDI, and HDI refers to parts by weight when a weight of an entire isocyanate-based compound is designated as 100 parts by weight.

In Table 1, ppm was converted based on the weight.

TABLE 2

|  | Modulus | Refractive Index | Plasticizer absorbing Rate | Evaluation of Bonding Strength |
|---|---|---|---|---|
| Example 1 | ○ | 1.572 | pass | pass |
| Example 2 | ○ | 1.574 | pass | pass |
| Example 3 | ○ | 1.606 | pass | pass |
| Comparative Example 1 | X | 1.588 | pass | pass |
| Comparative Example 2 | ○ | 1.561 | fail | pass |
| Comparative Example 3 | X | 1.565 | fail | pass |
| Comparative Example 4 | ○ | 1.537 | fail | pass |

In accordance with Table 2, all refractive indices measured in Examples and Comparative Examples were verified as 1.50 or more. On the other hand, it can be confirmed that cases of Examples 1 to 3 and Comparative Examples 2 and 4 have modulus values regulated to be 300 kgf/mm² or less; however, cases of Comparative Examples 1 and 3 have excessively high modulus values. This shows that a film applied with a thiourethane layer, according to the example embodiments, can have a refractive index maintained within a certain range and a modulus that can be regulated to suit a winding process.

In Table 2, all Examples and Comparative Examples samples were judged as Pass in the bonding strength evaluation. Additionally, Examples 1 to 3 showed 2% or less plasticizer absorbing rates, but in contrast, Comparative Examples 2 to 4 showed more than 2% plasticizer absorbing rates. Thus, it is apparent after an understanding of the disclosure of this application that a film applied with a thiourethane layer in accordance with the example embodiments can inhibit refractive index variation of a thiourethane layer, does not degrade a bonding strength between a base layer and a thiourethane layer, and has a plasticizer absorbing rate regulated to be below the desired level.

In a general aspect, a composition for manufacturing a thiourethane layer includes a polyfunctional compound and an isocyanate-based compound.

The polyfunctional compound includes a thiol-based compound or a polyol compound including two or more hydroxyl group or thiol group.

The thiol-based compound includes a heterocyclo-alkanediyl group having carbon atoms of 4 to 10 and sulfur atoms of 1 to 5.

The isocyanate-based compound includes a linear aliphatic polyvalent isocyanate compound having two or more isocyanate groups.

The linear aliphatic polyvalent isocyanate compound may include an alkanediyl having carbon atoms of 4 to 10 in the main chain.

The composition for manufacturing a thiourethane layer may include the thiol-based compound in a mole ratio of 50 to 97 based on the polyfunctional compound in an amount of 100.

The polyol compound may include a polyether polyol having a number-average molecular weight of 100 to 1000.

The thiol-based compound and the isocyanate-based compound may be included in the composition for manufacturing a thiourethane layer in a mole ratio of 1:0.7 to 1.3.

The thiol-based compound and the linear aliphatic polyvalent isocyanate compound may be included in the composition for manufacturing a thiourethane layer in a mole ratio of 1:0.7 to 1.3.

Based on the sum 100 of an amount of the isocyanate-based compound and an amount of the polyether polyol, the thiol-based compound may be included in the composition for manufacturing a thiourethane layer in a mole ratio of 55 to 120.

Based on the sum 100 of an amount of the linear aliphatic polyvalent isocyanate compound and an amount of the polyether polyol, the thiol-based compound may be included in the composition for manufacturing a thiourethane layer in a mole ratio of 55 to 120.

The composition for manufacturing a thiourethane layer may be applied to the manufacture of a thiourethane layer or a high refractive layer.

In a general aspect, a manufacturing method for a thiourethane resin includes a reacting operation of inducing reaction of i) isocyanate group and hydroxyl group or ii) isocyanate group and thiol group in a composition for manufacturing a thiourethane layer including an isocyanate-based compound and a polyfunctional compound, thereby preparing a reacting solution; and an aging operation of reacting the reacting solution at an aging temperature of 100 to 150° C. to manufacture a thiourethane resin.

The thiourethan resin may be applied to the manufacture of a thiourethane layer or a high refractive layer.

In a general aspect, a film for bonding includes a high refractive layer including a thiourethane-based repeat unit.

The high refractive layer has a refractive index of 1.5 or more, and a modulus of 300 kgf/mm² or less.

The film for bonding may further include a base layer disposed on a surface of the high refractive layer.

A value of subtracting a refractive index value of the base layer from a refractive index value of the high refractive layer may be 0.02 or more.

A value of subtracting a modulus value of the base layer from a modulus value of the high refractive layer may be 0.1 to 299 kgf/mm² or more.

A bonding strength between the base layer and the high refractive layer may be 8 kgf/cm or more.

The high refractive layer may contain sulfur atoms in an amount of 15 to 35 wt %.

The high refractive layer may include a repeat unit including an alkanediyl having carbon atoms of 5 to 9.

The high refractive layer may include a heterocyclo-alkanediyl-based repeat unit indicated by Formula 1 and a linear alkanediyl-based repeat unit indicated by below Formula 2.

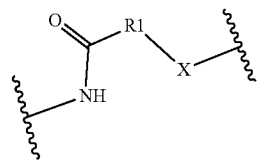

[Formula 1]

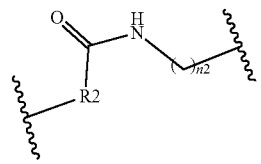

[Formula 2]

In the Formula 1, R1 is —O— or —S—, and X is a heterocyclo-alkanediyl group having carbon atoms of 3 to 10 and sulfur atoms of 1 to 5.

In the Formula 2, R2 is —O— or —S—, and n2 is an integer of 4 to 10.

The heterocyclo-alkanediyl-based repeat unit may include a repeat unit indicated by below Formula 3.

[Formula 3]

$$\text{structure}$$

In Formula 3, R1 is —O— or —S—, and n11 and n12 are each independent integers of 0 to 3.

The film for bonding may include a HUD area having the functionality of preventing double image formation.

The high refractive layer may include a first surface and a second surface facing the first surface.

In the HUD area, the first surface and the second surface may not be parallel in part or the whole of the high refractive layer.

The high refractive layer may include a first point and a third point placed on the first surface, and a second point and a fourth point placed on the second surface, in the HUD area.

The third point may be placed to be distanced from the first point by 1 cm in a width direction of the film for bonding.

The first and second points are placed on the same line in a thickness direction of the film for bonding.

The third and fourth points are placed on the same line in a thickness direction of the film for bonding.

An extension line passing the first point and the third point is a first line, and an extension line passing the second point, and the fourth point is a second line.

An angle formed by the first line and the second line at a contact point of the first line and the second line is W, and the W may be 0.01 to 1.2 degrees as an even or uneven value in a width direction of the film for bonding in the HUD area.

In a general aspect, a film for bonding includes a high refractive layer, and the high refractive layer may have a plasticizer absorbing amount of less than 3 wt % of the weight of the high refractive layer.

The high refractive layer includes a thiourethane-based repeat unit.

The high refractive layer may have a refractive index of 1.5 or more.

The film for bonding may further include a base layer placed on a surface of the high refractive layer and including a plasticizer.

Detailed descriptions of the high refractive layer, the base layer, the thiourethane-based repeat unit, the film for bonding, and the like are overlapped with the above and thus the further description is omitted.

In a general aspect, a light transmitting laminate includes a first light transmitting layer; the film for bonding placed on a surface of the first light transmitting layer and described in the above; and a second light transmitting layer placed on the film for bonding.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A film for glass bonding comprising:
    a thiourethane layer comprising a heterocyclo-alkanediyl-based repeat unit indicated by Formula 1, $$\text{structure}$$

and a linear alkanediyl-based repeat unit indicated by Formula 2, $$\text{structure}$$

and
    a base layer, disposed on a surface of the thiourethane layer, comprising a polyvinyl acetal resin and a plasticizer,
    wherein in the Formula 1, R1 is —O— or —S—, and X is a heterocyclo-alkanediyl group having carbon atoms of 3 to 10 and sulfur atoms of 1 to 5,
    wherein in the Formula 2, R2 is —O— or —S—, and n2 is an integer of 4 to 10, and
    wherein the thiourethane layer comprises a wedge-shaped section whose thickness varies in a width direction of the film in part or the whole of the thiourethane layer.

2. The film of claim 1,
    wherein the heterocyclo-alkanedyil-based repeat unit comprises a repeat unit indicated by Formula 3

$$\text{structure}$$

wherein R1 is —O— or —S—, and n11 and n12 are respectively independent integers of 0 to 3.

3. The film of claim 1,
    wherein the thiourethane layer has a refractive index of 1.5 or more, and a modulus of 300 kgf/mm$^2$ or less.

4. A manufacturing method for a film comprising:
putting a thiourethane resin comprising a thiourethane-based repeat unit indicated by Formula 1,

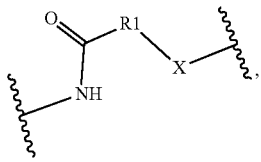

and a linear alkanedyil-based repeat unit indicated by Formula 2,

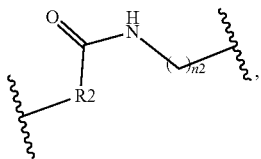

into an extruder;
extruding the thiourethane resin at a temperature of 120 to 200° C. to manufacture a thiourethane layer;
putting a resin composition comprising a polyvinyl acetal resin and a plasticizer into an extruder and extruding the resin composition to manufacture a base layer; and
hot pressing the base layer disposed on a surface of on the thiourethane layer to form the film,
wherein the film comprises the thiourethane layer and the base layer disposed on a surface of the thiourethane layer, and
wherein the film is a film for glass bonding,
wherein in the Formula 1, R1 is —O— or —S—, and X is a heterocyclic-alkanedyil group having carbon atoms of 4 to 10 and sulfur atoms of 1 to 5,
wherein in the Formula 2, R2 is —O— or —S—, and n2 is an integer of 4 to 10, and
wherein the thiourethane layer comprises a wedge-shaped section whose thickness varies in a width direction of the film in part or the whole of the thiourethane layer.

5. A light transmitting laminate comprising:
a first light transmitting layer;
the film disposed on a surface of the first light transmitting layer in accordance with claim 1; and
a second light transmitting layer disposed on the film.

* * * * *